United States Patent [19]

Fukuda

[11] 4,268,882
[45] May 19, 1981

[54] MAGNETIC ERASING HEAD

[75] Inventor: Kazumasa Fukuda, Tokyo, Japan

[73] Assignee: TDK Electronics Co., Ltd., Tokyo, Japan

[21] Appl. No.: 95,503

[22] Filed: Nov. 19, 1979

[30] Foreign Application Priority Data

Dec. 1, 1978 [JP] Japan .............................. 53-147848

[51] Int. Cl.³ .......................... G11B 5/27; G11B 5/25; G11B 5/12
[52] U.S. Cl. .................................. 360/118; 360/120; 360/121; 360/125
[58] Field of Search .............................. 360/118-122, 360/125, 66

[56] References Cited

U.S. PATENT DOCUMENTS

| 2,635,149 | 4/1953 | Cain | 360/118 |
|---|---|---|---|
| 2,653,189 | 9/1953 | Camras | 360/119 |
| 2,736,776 | 2/1956 | Camras | 360/118 |
| 2,993,096 | 7/1961 | Radocy | 360/118 |
| 3,562,443 | 2/1971 | Bos et al. | 360/118 |
| 3,582,571 | 6/1971 | Sprott et al. | 360/118 |
| 3,584,375 | 6/1971 | Gingerich et al. | 360/121 |
| 3,946,440 | 3/1976 | Saito | 360/118 |
| 3,947,891 | 3/1976 | Saito et al. | 360/118 |
| 3,961,374 | 6/1976 | Murata et al. | 360/118 |
| 4,180,835 | 12/1979 | Okumura et al. | 360/118 |

Primary Examiner—Alfred H. Eddleman
Attorney, Agent, or Firm—Oblon, Fisher, Spivak, McClelland & Maier

[57] ABSTRACT

A magnetic erasing head including a rear part on which an exciting coil is wound, side parts extended from the rear part, a front part on which two or more gaps are formed with each spacer made of a non-magnetic substance. An angle of one of the gaps is different from an angle of the other gap.

3 Claims, 4 Drawing Figures

MAGNETIC ERASING HEAD

BACKGROUND OF THE INVENTION

1. Field of the Invention

The present invention relates to a magnetic erasing head. More particularly, it relates to a magnetic erasing head for erasing information in a magnetic tape having high coercive force.

2. Description of the Prior Art

A magnetic recording medium such as a magnetic tape have been developed to have higher coercive force because of the requirement of higher density for the information in the magnetic recording medium.

The magnetic tape having high coercive force has the advantage of a remarkable increase of its recording density because of a smaller demagnetization loss in the short wave length region. However, it has the disadvantage of difficulty of erasing.

It has been required to improve the erasing of the informations in the magnetic recording medium such as a magnetic tape.

SUMMARY OF THE INVENTION

It is an object of the present invention to provide an improvement for erasing information in a magnetic tape.

It is another object of the present invention to provide an erasing head for effectively erasing information in a magnetic tape having high coercive force.

The foregoing and other objects of the present invention have been attained by providing an erasing head having plural gaps wherein an angle of one of the gaps to the transit direction of a magnetic tape is different from an angle of the other gap to the transit direction of the magnetic tape.

DETAILED DESCRIPTION OF THE PREFERRED EMBODIMENTS

Figure 1:
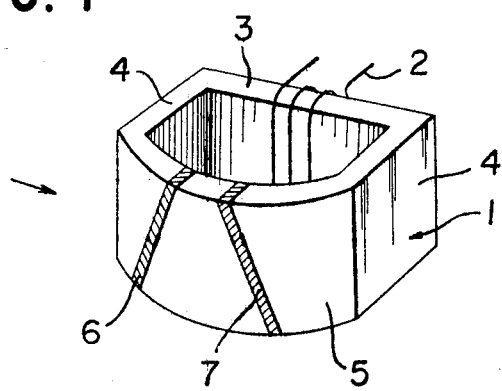
FIG. 1 is a schematic view of one embodiment of the magnetic erasing head of the present invention.

The advantageous feature of the structure of the erasing head of the present invention is to provide an erasing head having plural gaps at the front part wherein the angle of one gap to the transit direction of the magnetic tape is different from the angle of the other gap to the transit direction of the magnetic tape.

When the erasing head having said structure is used, the magnetic tape receives a magnetic field for erasing from one gap whose direction is different from that of the other gap. Thus, the magnetic powder as the important element of the magnetic tape effectively receives the magnetic disturbance under high intensity and with high efficiency whereby the random effect of the direction of magnetization of the magnetic powder by passing through the erasing head is improved. As a result, the erasing efficiency is improved and a high erasing effect can be given even though the erasing current is small and noise can be decreased.

Referring to the drawings, certain embodiments of the present invention will be illustrated.

FIG. 1 is a schematic view of one embodiment of the erasing head of the present invention. The erasing head (1) is made of a high permeability substance such as a Permalloy laminate and ferrite core. An exciting coil (2) is wound on the rear part (3) from which the side parts (4), (4) are extended and the front part (5) is formed and the front part is contacted with the magnetic tape. The front part (5) is divided into three parts by a first gap (6) and a second gap (7) in which each a spacer made of a non-magnetic substance is inserted. Thus, when the current is passed through the coil (2), the magnetic flux is leaked from the gaps (6), (7). The gaps (6), (7) are formed at different directions to the perpendicular to transit direction of the magnetic tape as shown by the arrow mark. The gap (6) is at an acute angle to the transit direction of the magnetic whereas the gap (7) is at an obtuse angle to the transit direction and the gaps are elongated in the transversal direction of the front part of the erasing head.

The magnetic flux leaked from the gaps (6), (7) passes the magnetic flux path whose reluctance is minimal. Therefore, the magnetic flux is passed to the direction perpendicular to the magnetic pole plane having the gaps i.e. the direction of crossing the gaps and the magnetic field formed by leakage as the erasing magnetic field is formed in the same direction.

A desired slant angles of the gaps (6), (7) can be easily determined by certain experiments.

The erasing head has the above-mentioned structure. When the magnetic tape for erasing is transitted to the arrow direction upon contacting the front part of the erasing head of the present invention, the erasing magnetic field formed by the leakage from the first gap (6) gives the magnetic field in one direction to all of the magnetic tape (alternating magnetic field which is attenuated by the transit of the magnetic tape) whereby a primary erasing is carried out. The erasing magnetic field having different direction is given to all of the magnetic tape by the second gap (7). Thus, the erasing magnetic fields given by the first and second gaps have respectively different directions whereby the magnetic powder in the magnetic tape are exposed to the disturbance and attenuation magnetic field having different direction whereby the complete erasing can be attained.

Figure 2:
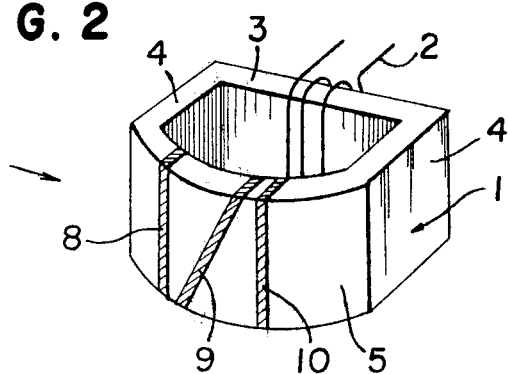
FIG. 2 is a schematic view of the other embodiment of the magnetic erasing head of the present invention.

FIG. 2 shows the second embodiment of the erasing head of the present invention wherein the identical numerals designate the same or corresponding parts in FIG. 2.

The erasing head of this embodiment has three leakage gaps. The first gap (8) is formed in the left side (in FIG. 2) and is extended in the perpendicular to the transit direction of the magnetic tape (the arrow direction). The second gap (9) is formed at the central part and is extended in a slanted direction to the transversal direction of the erasing head. The third gap (10) is extended in a perpendicular direction to the transit direction of the magnetic tape (the same as that of the first gap (8)).

The function of this embodiment is similar to that of the first embodiment. The number of the gaps is increased to be three gaps and accordingly, the erasing steps are carried out to all of the magnetic tape three times whereby superior effective erasings can be attained. Moreover, the magnetic powder is arranged in different directions during three erasing steps whereby complete erasing is attained.

The shape of the gap is preferably a linear line though a curved line can be considered. The thickness of the gap is wellknown and it will not be discussed. However, a uniform gap is preferable. The angle of the gap to the perpendicular direction can be determined and is usually at greater than 5 degrees preferably at greater than 10 degrees and especially at greater than 15 degrees, but it is not suitable to be greater than 70 degrees in view of the length of the front part of the erasing head. When one gap is formed in a leftward slanted direction, the other gap is preferably formed in rightward slanted direction though it can be perpendicular to the transit direction of the magnetic tape.

In accordance with the present invention, the erasing function can be applied in different directions whereby the erasing of the information in the magnetic recording medium such as the magnetic tape having high coercive force can be easily attained with high efficiency and the above-mentioned effects can be attained.

Figure 4:
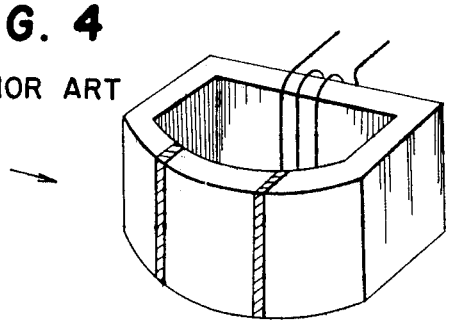
FIG. 4 is a schematic view of the conventional two gaps type erasing head.
Figure 3:
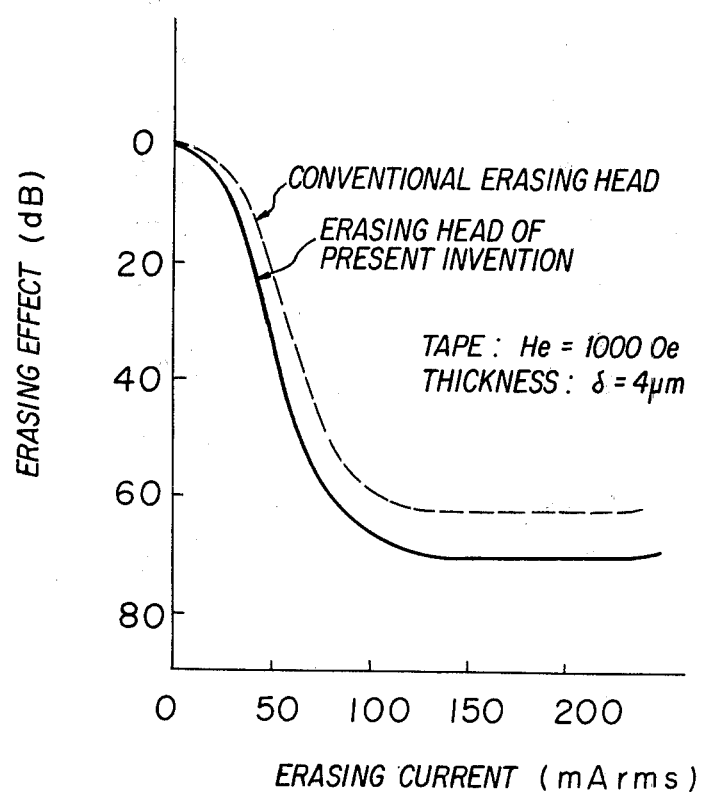
FIG. 3 is a graph for comparing the erasing efficiency of the erasing head of the present invention to that of the conventional erasing head.

In FIG. 3, the effect of the magnetic erasing head of the present invention (shown in FIG. 1) is compared with the effect of the conventional magnetic erasing head shown in FIG. 4. The magnetic tape having a coercive force of Hc=1000 Oe is used. In the conventional erasing head shown in FIG. 4, two gaps are extended in the direction perpendicular to the transit direction of the magnetic tape. The substance, the size, and the number of turns of the coil are the same as those of FIG. 1. Only the slant angle of the gap is different between them.

The frequency of the erasing current passed through the erasing head is 100 KHz. The relation of the erasing currents and the erasing effect is shown in FIG. 3. The full line shows the erasing effect (dB) of the erasing head of the present invention. The dotted line shows the erasing effect (dB) of the conventional erasing head shown in FIG. 4. As it is clear from FIG. 3, the erasing head of the present invention imparts a remarkably high erasing efficiency in comparison with the conventional erasing head when the erasing current is the same. On the other hand, the erasing current can be decreased to impart the same erasing effect.

In accordance with the present invention, the erasing head which imparts remarkably excellent effect can be obtained.

I claim:

1. A magnetic erasing head comprising:
a head formed of a highly permeable substance having two or more gaps of uniform thickness formed on a front part thereof;
a spacer made of a non-magnetic substance disposed in each of said gaps and extending from one side to the other of said front part of said head wherein an angle of one of said gaps to a transit direction of a magnetic tape is an acute angle and an angle of the other gap to the transit direction of the magnetic tape is an obtuse angle.

2. A magnetic erasing head comprising:
a head formed of a highly permeable substance having at least three gaps of uniform thickness formed on a front part thereof;
a spacer made of non-magnetic substance disposed in each of said gaps and extending from one side to the other of said front part wherein an angle of one of said three gaps to a transit direction of a magnetic tape is different from the angles of the remaining two gaps and wherein the remaining two gaps are perpendicular to said transit direction.

3. A magnetic erasing head according to claim 1 wherein an angle of one of said gaps to the direction perpendicular to the transit direction of the magnetic tape is greater than 5 degrees.

* * * * *